May 14, 1929.  B. D. McINTYRE  1,712,673
HEATER FOR MOTOR VEHICLES
Filed June 1, 1925
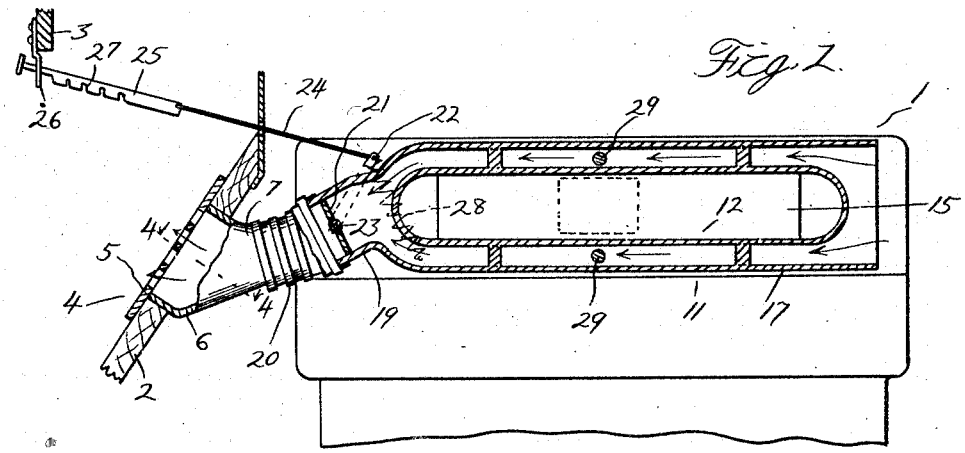
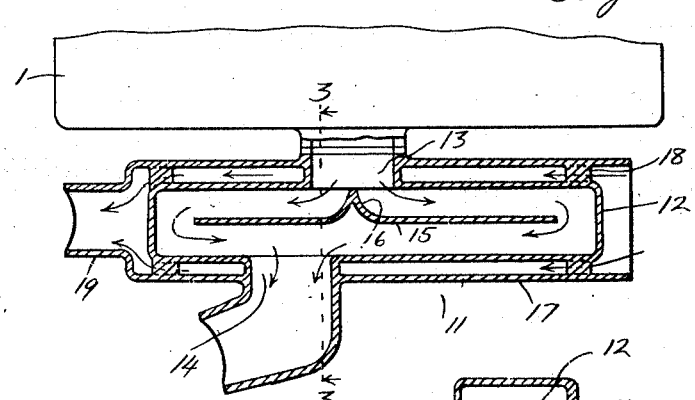
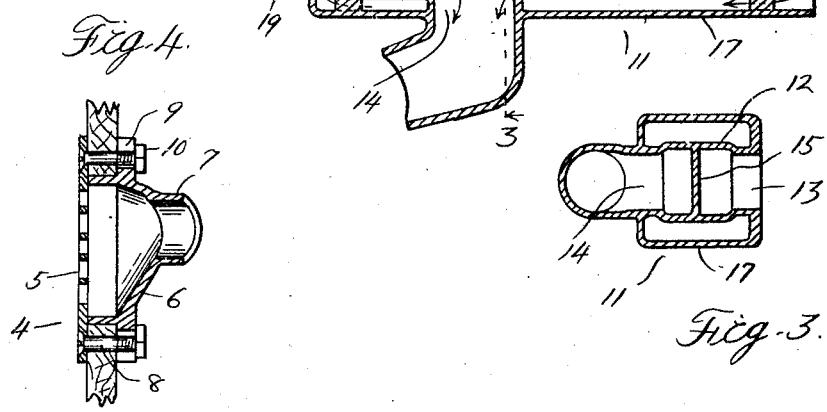
Inventor
Brouwer D. McIntyre Patented May 14, 1929.

1,712,673

UNITED STATES PATENT OFFICE.

BROUWER D. McINTYRE, OF MONROE, MICHIGAN.

HEATER FOR MOTOR VEHICLES.

Application filed June 1, 1925. Serial No. 34,217.

The invention relates to heaters for motor vehicles. Heretofore heaters have been customarily built of sheet metal but they are objectionable inasmuch as they seem to intensify the noise of the engine, such as valve tappet noise, and make this noise more noticeable in the motor vehicle. Furthermore, these heaters radiate the heat fairly rapidly and as a consequence do not efficiently heat the air which is being passed into the interior of the motor vehicle.

The construction of my heater is very simple and also does not transmit the motor noises to the interior of the motor vehicle. Furthermore my heater effectively heats the air being passed to the interior of the motor vehicle and maintains this air free from contamination by the exhaust gases of the engine. Other objects are to form the exhaust manifold and the casing, forming with the exhaust manifold the air passageway, in one piece to eliminate any libility of rattles or vibration between the manifold and casing; to control the passage of the air through the air passageway by a valve located in the casing and in advance of the interior of the motor vehicle thereby entirely cutting off the heat from the interior of the car and precluding the necessity of removing the heater in the summer months; and to provide means for conducting heat from the exhaust manifold into the casing surrounding the same to heat the latter, thereby more efficiently heating the air passing through the air passageway. With these as well as other objects in view the invention resides in the novel features of construction and combinations and arrangements of parts as more fully hereinafter set forth.

In the drawings:

Figure 1 is a sectional side elevation of a portion of a motor vehicle having a heater, embodying my invention;

Figure 2 is a sectional plan view of a portion thereof;

Figure 3 is a cross section on the line 3—3 of Figure 2;

Figure 4 is a cross section on the line 4—4 of Figure 1.

1 is the internal combustion engine of the motor vehicle, 2 the floor and 3 the dash of the body. For heating the interior of the body I have provided the register 4 formed of the perforated plate 5 above the floor and the box 6 extending upwardly through the floor and having the neck 7 therebeneath. The plate is secured to the box by suitable means such as the screws 8 extending through the plate and between the bifurcations 9 upon opposite sides of the box and the nuts 10 threaded upon the lower ends of the screws. I have also provided the integral structure or unit 11, which includes both the exhaust manifold and the casing, forming with the exhaust manifold the passageway for air to be heated and passed to the register and thence into the interior of the body. In detail, 12 is the exhaust manifold, which is substantially rectangular in cross section and has closed ends, the inlet and outlet openings 13 and 14 respectively of this manifold being located intermediate its ends and at opposite sides. The manifold is provided with the vertical baffle 15, extending between its upper and lower walls and terminating inwardly from its end walls. This baffle extends substantially centrally of the manifold and has a middle V-shaped portion 16, which extends toward the inlet opening 13 to deflect the exhaust gases passing from the engine in opposite directions within the manifold toward its opposite end when they reverse their directions and pass outwardly through the outlet opening. 17 is the casing completely surrounding the exhaust manifold 12 and having its walls spaced from the walls of the exhaust manifold on all sides to form a passageway extending longitudinally of the exhaust manifold for the air. 18 are webs formed integral with the casing and manifold to assist in the relative positioning of the same and also to conduct heat from the manifold to the casing thereby raising the temperature of the latter and providing the air passageway with the walls heated on all sides. The front end of the casing 17 is open while its rear end is formed with the neck 19 located in advance of the register box 6. The manifold and casing are cast in one piece to eliminate the possibility of rattles or vibration between the casing and manifold and furthermore to avoid conducting engine noises such as tappet noises into the interior of the motor vehicle.

20 is flexible tubing forming with the register a conduit for conducting the air from the air passageway to the interior of the motor vehicle. This tubing is sleeved upon the necks 7 and 19 of the register box and casing respectively and permits of the relative movement of the vehicle body and engine occurring during the movement of the motor vehicle.

For controlling the passage of the air into the interior of the motor vehicle and at the same time providing a construction which entirely cuts off the heat from the interior of the motor vehicle or immediate proximity thereto and thereby precluding the necessity of removing the heater in the summer months, I have provided the valve 21 preferably in the nature of a butterfly valve, which is located in the neck 19 of the casing 17 and consequently is located in advance of the floor of the body. This valve is operated by means of the lever 22 mounted upon the valve shaft 23 and connected by the wire 24 to the bar 25, which bar is longitudinally slidably adjustable in the clip 26 secured upon the dash 3. As shown the bar is provided with the series of upwardly and rearwardly inclined notches 27, which are alternatively engageable with the base of the clip and by means of which the valve is held in various positions of adjustment against the tension exerted by the coil spring 28, having one end secured to the lever 22 and the other end secured preferably to the casing 17.

The unitary structure including the exhaust manifold and casing surrounding and spaced from the exhaust manifold and forming therewith the air passageway is designed particularly for use with a standard internal type of internal combustion engine in which part of the exhaust manifold is located in the engine itself. Consequently, my unitary structure is designed to replace the detachable part of the exhaust manifold of this engine and is secured to the engine in the same manner as by means of the pair of cap bolts 29, which extend through the opposite side walls of the casing 17 intermediate its ends and above and below the exhaust manifold.

What I claim as my invention is:

1. In a heater for motor vehicles, an integral structure comprising the exhaust manifold of the internal combustion engine having inlet and outlet openings in its opposite sides intermediate its ends, and a longitudinally extending baffle for deflecting the exhaust gases entering through said inlet opening in opposite directions toward its ends, and a surrounding casing spaced on all sides from said manifold and forming therewith an air passageway, said casing having an open front end and a valve controlled rear end.

2. In a heater for motor vehicles, an integral structure comprising the exhaust manifold of the internal combustion engine having an inlet opening in its side intermediate its ends, and a longitudinally extending baffle having a middle V-shaped portion for deflecting the exhaust gases entering through said inlet opening in opposite directions towards its ends, and a surrounding casing spaced on all sides from said manifold and forming therewith an air passageway, said casing having an open front end.

3. In a heater for motor vehicles, an integral structure comprising the exhaust manifold of the internal combustion engine having an inlet opening intermediate its ends, and a baffle member provided with a middle V-shaped portion arranged adjacent said inlet opening for deflecting the exhaust gases entering through said inlet opening in opposite directions towards its ends, and a surrounding casing spaced from said manifold and forming therewith an air passageway, said casing having an open front end and a valved rear end.

In testimony whereof I affix my signature.

BROUWER D. McINTYRE